United States Patent [19]

Hashimoto

[11] Patent Number: 5,555,178

[45] Date of Patent: Sep. 10, 1996

[54] CONTROL APPARATUS AND METHOD FOR HOLDING A WORKPIECE IN A MACHINE TOOL

[75] Inventor: Hiroshi Hashimoto, Aichi, Japan

[73] Assignee: Mitsubishi Denki Kabushiki Kaisha, Tokyo, Japan

[21] Appl. No.: 153,042

[22] Filed: Nov. 17, 1993

[30] Foreign Application Priority Data

Nov. 17, 1992 [JP] Japan ................... 4-307041

[51] Int. Cl.⁶ .................... B23B 23/00; G06F 19/00
[52] U.S. Cl. ................... 364/474.17; 82/148
[58] Field of Search ............ 364/474.12, 474.16, 364/474.17, 474.34, 474.37, 474.19; 82/1.11, 117, 118, 142, 148, 106, 165

[56] References Cited

U.S. PATENT DOCUMENTS

| | | | |
|---|---|---|---|
| 3,731,564 | 5/1973 | Diener et al. | 82/148 |
| 3,732,757 | 5/1973 | Cottin | 82/142 |
| 5,025,689 | 6/1991 | Mayer | 82/106 |
| 5,181,441 | 1/1993 | Okada | 82/1.11 |

FOREIGN PATENT DOCUMENTS

| | | | |
|---|---|---|---|
| 0334298 | 9/1989 | European Pat. Off. | |
| 4208701 | 9/1993 | Germany | 82/148 |
| 61-019531 | 1/1986 | Japan | |
| 2-109602 | 4/1990 | Japan | 82/1.11 |
| 2-139101 | 5/1990 | Japan | 82/1.11 |
| 3-170202 | 7/1991 | Japan | 82/148 |
| 4-63603 | 2/1992 | Japan | 82/148 |

OTHER PUBLICATIONS

Präzisions–Drehmaschinen höchster Genauigkeitsklasse, P. H. Knot & D. Szepesi, Feinwerktechnik & Messtechnik, vol. 95, No. 1, Jan./Feb. 1987, pp. 17–21.

Primary Examiner—Roy N. Envall, Jr.
Assistant Examiner—Steven R. Garland
Attorney, Agent, or Firm—Sughrue, Mion, Zinn, Macpeak & Seas

[57] ABSTRACT

A machine tool such as a lathe for machining a workpiece having a longitudinal axis and being held at opposite axial ends by face drivers that are affixed to the spindle of a moveable headstock and securely contact the workpiece end faces with a predetermined pressure. A first servo loop is established to control the position of the headstock on the basis of detected position information and a second servo loop is established to control the movement of the head stock so that the pressure against the workpiece end faces is kept at predetermined values. The second servo loop may utilize the detected position of the headstock or it may utilize the monitored command value for purposes of judging whether modifications to the command value are necessary to provide the desired pressure values. A torque limiter also may be used to provide the desired control.

19 Claims, 11 Drawing Sheets

(A) ACCUMULATION OF COMMAND VALUES (B) POSITION FEEDBACK

CONTROL APPARATUS AND METHOD FOR HOLDING A WORKPIECE IN A MACHINE TOOL

BACKGROUND OF THE INVENTION

1. Field of the Invention

The present invention relates to a control apparatus and method for a machine tool, comprising opposed workpiece holding structures, for machining a workpiece held by the workpiece holding structures.

2. Description of the Background Art

Currently, machine tools such as a combined lathe, which holds a long workpiece by means of opposed workpiece holding mechanisms or structures, e.g., headstocks, and turns the workpiece while simultaneously driving the headstocks, are put to practical use. The use of a combined lathe is necessary where the workpiece is long and would twist or deform if driven only at one end.

Figure 9:
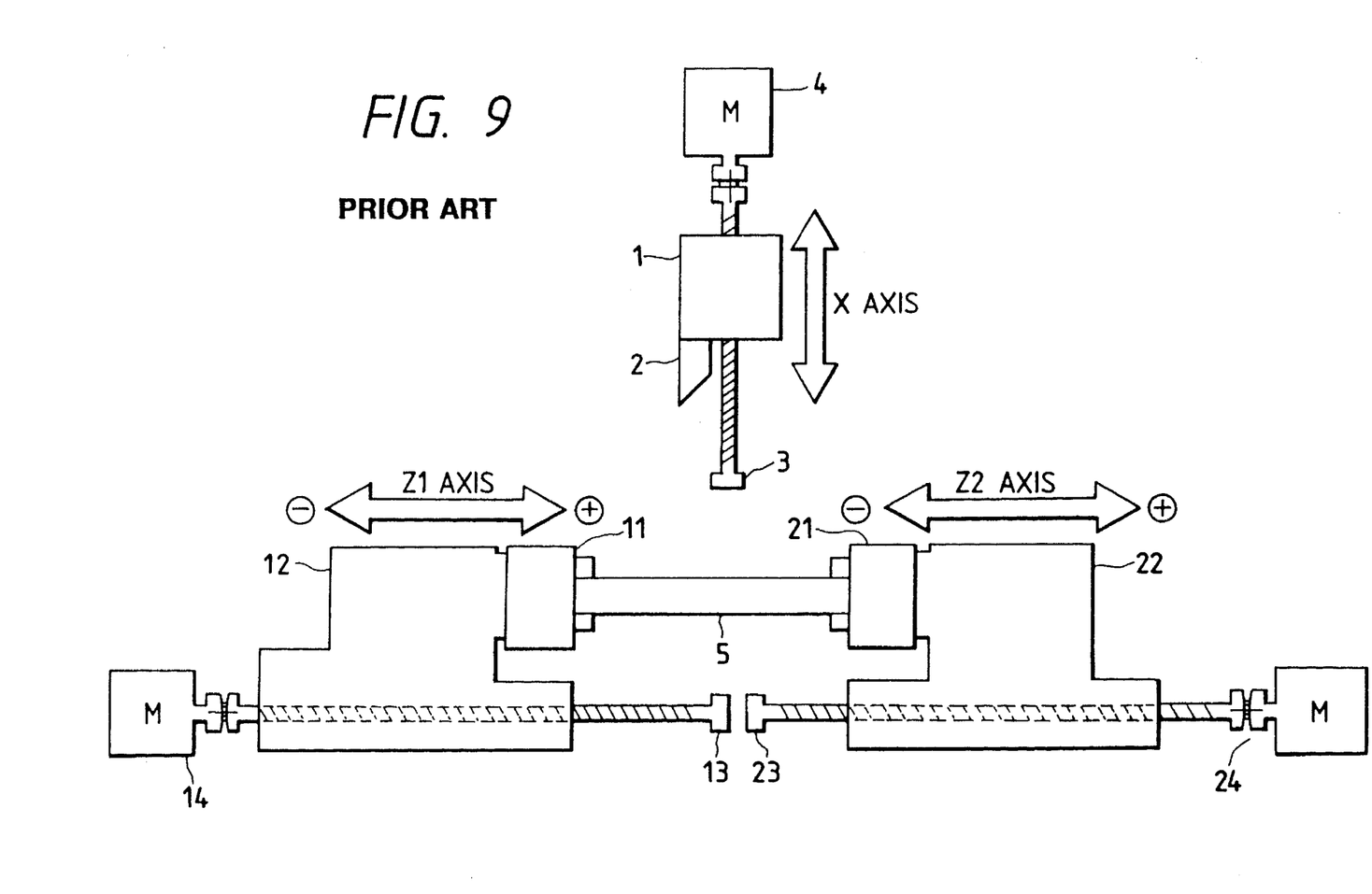
FIG. 9 is an arrangement diagram of a conventional apparatus.

FIG. 9 is an arrangement diagram showing a conventional combined lathe, as disclosed in Japanese Laid-Open Patent Publication No. HEI4-65701 wherein the numeral 1 indicates a tool rest, 2 denotes a cutting tool fitted to the tool rest 1, 3 designates a ballscrew coupled with the tool rest 1 for driving the tool rest, 4 represents an X-axis servo motor coupled with the ballscrew 3 for driving the ball screw, 5 indicates a workpiece, 11 designates a chuck for gripping one end of the workpiece 5, 12 denotes a headstock mounted with a spindle, 13 represents a ballscrew coupled with the headstock 12 for driving the headstock, and 14 indicates a Z-axis servo motor coupled with the ballscrew 13 for driving the ballscrew. There also are identical units 21–24, which correspond to the chuck 11, headstock 12, ballscrew 13 and Z-axis servo motor 14, and therefore will not be described.

This combined lathe turns the single workpiece 5 which is gripped at both ends by the chucks 11, 21. The lathe controls the movement of the headstocks 12, 22 simultaneously, in synchronization with each other.

Figure 10:
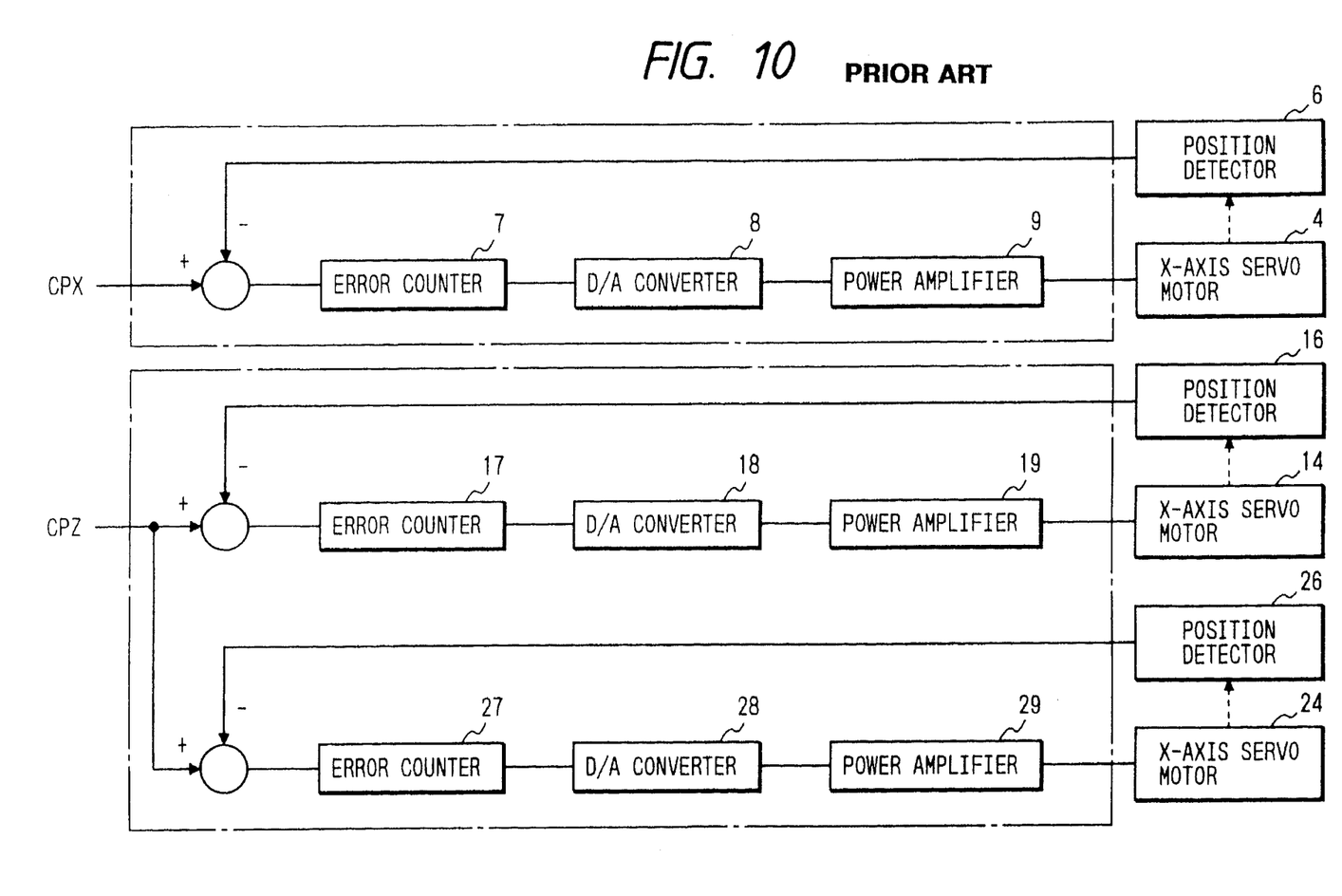
FIG. 10 illustrates the details of an NC and servo amplifiers shown in FIG. 9.

FIG. 10 is a block diagram of servo amplifiers for a control apparatus, e.g., a numerical control apparatus (hereinafter referred to as the "NC"), for controlling the lathe shown in FIG. 9. In FIG. 10, an X-axis servo motor 4 is used for driving the tool rest 1. A position detector 6 detects the position of the tool rest 1, and an error counter 7 determines the difference between a position command pulse CPX from the NC and a feedback pulse from the position detector 6. A digital-to-analog converter 8 converts the value of the error counter 7 into an analog value, and a power amplifier 9 amplifies the analog value output by the digital-to-analog converter 8 to drive the X-axis servo motor 4.

A second group of components 16 to 19 and a third group of components 26 to 29 correspond respectively to the position detector 6, error counter 7, digital-to-analog converter 8 and power amplifier 9 to drive the first Z-axis servo motor 14 and the second Z-axis servo motor 24, respectively.

CPZ is a Z-axis position command pulse given by the NC to drive the first Z-axis servo motor 14 and the second Z-axis servo motor 24 at the same time.

Operation will now be described. The X-axis direction travel of the tool rest 1 and the Z-axis direction travels of the headstocks 12, 22 in FIG. 9 can be achieved by executing a turning program stored on a paper tape (not shown) or in memory or the like in the NC. In the turning program, the movement along the X axis and Z axes has been programmed on a block-by-block basis in order of execution, e.g.:

N001 G01X100. Z200. F2.,
N002 GC0Z-50.;
.
.
.

These instructions result in a calculation of a corresponding axis travel-per-block by a central processor constituted by a CPU and memory not shown (in the NC unit). The travel-per-block is converted into corresponding axis position command pulse trains, such as the X-axis position command pulse train CPX and the Z-axis position command pulse train CPZ shown in FIG. 10, by a conventional pulse distributor.

The X-axis position command pulse train CPX is added to the contents of the error counter 7 and a difference between the pulse train and a feedback pulse, which is negatively-fed back from the position detector 6, is given to the power amplifier 9 through the digital-to-analog converter 8 to drive the servo motor 4 at the speed corresponding to the error value, thereby moving the tool rest 1.

The Z-axis position command pulse train CPZ is sent in a similar manner with the exception that it is given to both of the error counters 17, 27 to operate the two headstocks 12, 22 shown in FIG. 9 in synchronization with each other.

Figure 11A:
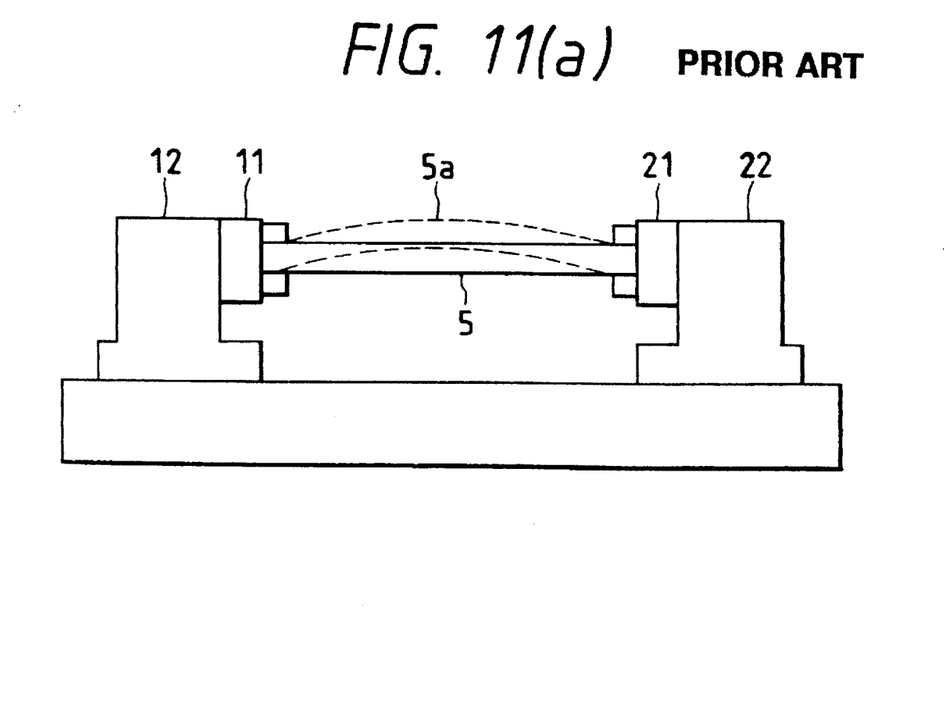
FIGS. 11(a) and 11(b) illustrate a machine and a workpiece distorted by displacement.
Figure 11B:
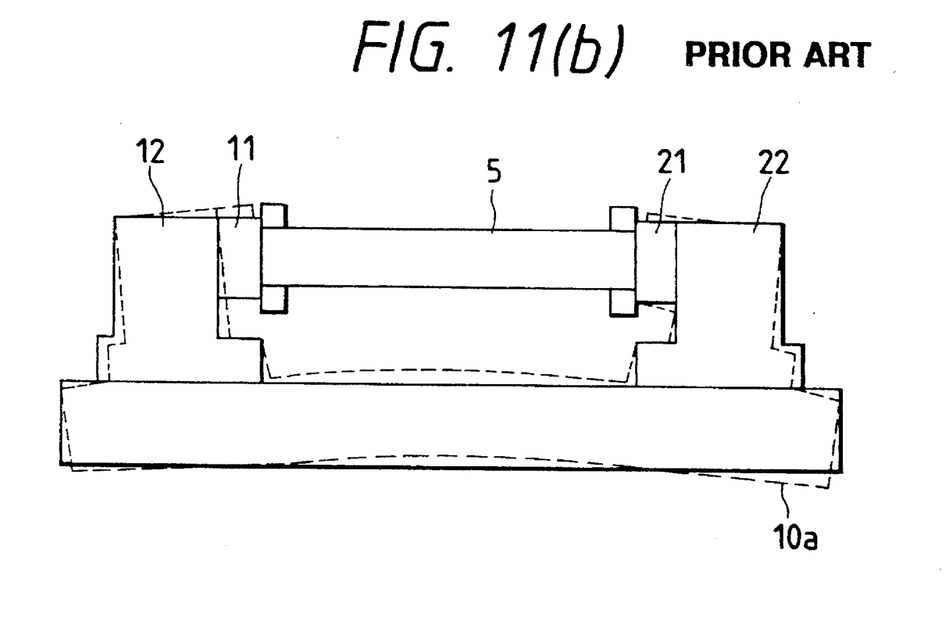

FIGS. 11(a) and 11(b) show the influence of the displacements of a mechanical system and a workpiece itself on the machine and the workpiece, wherein the continuous lines indicate the machine and the workpiece before displacement occurrence and the broken lines represent those after displacement occurrence.

FIG. 11(a) shows an example wherein the displacement is compensated for by the deformation of the workpiece 5 when the rigidity of the workpiece 5 is smaller than machine rigidity/servo rigidity. FIG. 11(b) shows an example wherein the displacement is compensated for by the deformation of the machine when the rigidity of the machine is smaller than workpiece rigidity/servo rigidity. Where the rigidity of the servo is smaller than workpiece rigidity/machine rigidity, the motor torque is saturated and control cannot be exercised, thereby bringing the motors or drive amplifiers to a stop because of overload.

Since the conventional workpiece holding method for a machine tool used chucks to secure a workpiece as described above, the shapes of the chucks had to be matched with the shape of the workpiece. Also, the portions of the workpiece that were secured by the chucks could not be machined, and/or the workpiece may be marred by chucking force.

Figure 12:
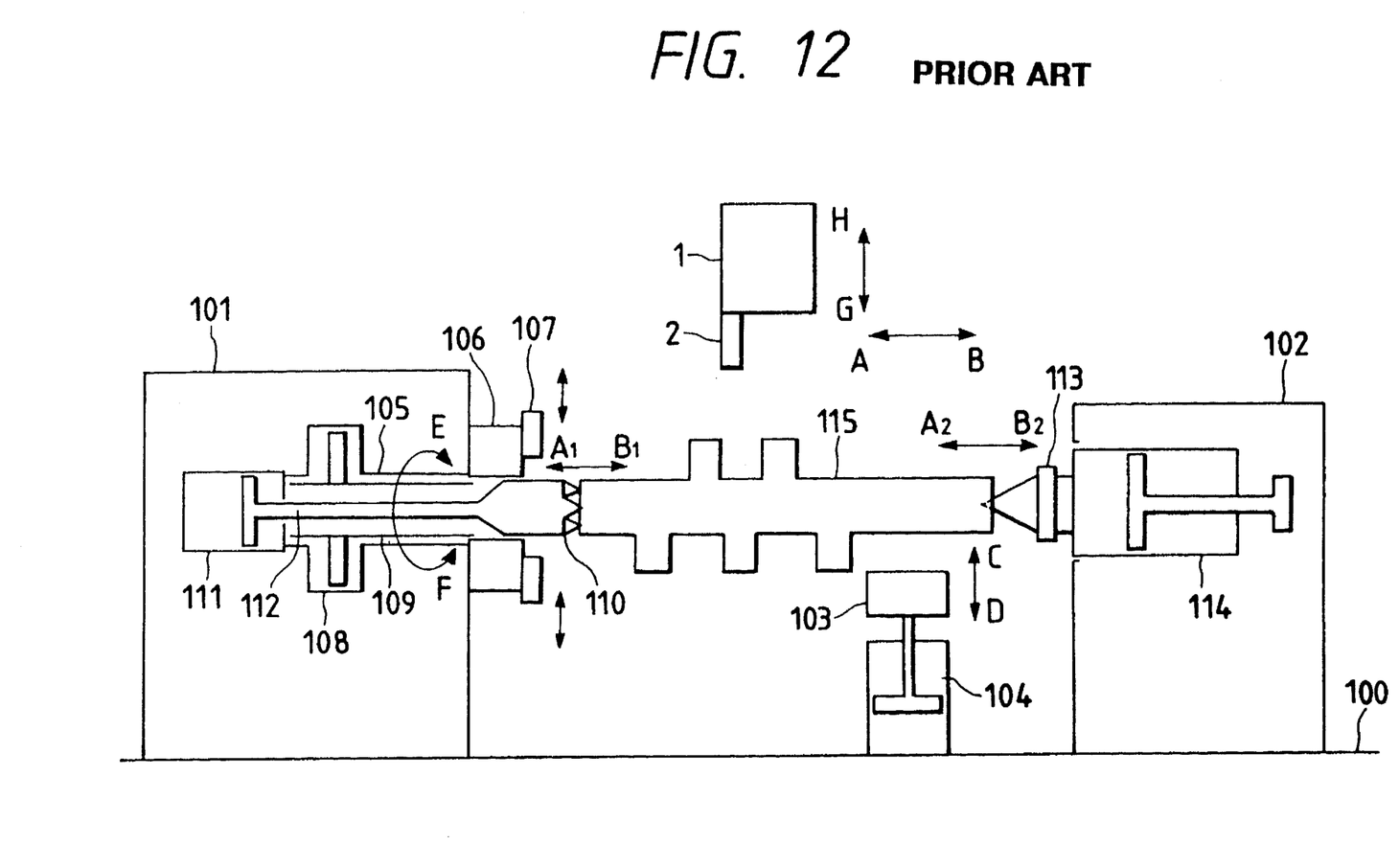
FIG. 12 illustrates the detail of another NC and servo amplifier showing the use of face drivers.

Another workpiece holding method in Japanese Laid-Open Patent Publication No. HEI4-69103 uses face drivers. In this conventional approach, an example wherein a workpiece is gripped by the face drivers and tail spindles is disclosed, as seen in FIG. 12. In FIG. 12, a tool rest 1 is arranged on a machine body 100 of a lathe so as to be movable in Z-axis directions of arrows A, B (the axial direction of the work spindle) and in X-axis directions of arrows G, H. A cutting tool 2 is mounted on tool rest 1.

On machine body 100, a headstock 101 is disposed on the left of tool rest 1 and a tailstock 102, on the right of tool rest 1 as viewed in FIG. 12. Further, on machine body 100 is a temporary holding stand 103, which is vertically movable in directions of arrows C, D through a pneumatic cylinder 104. Temporary holding stand 103 is interposed between headstock 101 and tailstock 102.

On headstock 101 is a cylindrical work spindle 105, which is rotatable in directions of arrows E, F. On a distal end of work spindle 105 is a chuck 106, which can rotate in directions of arrows E, F integrally with work spindle 105. A chuck gripper 107 is arranged on chuck 106 so as to be opened and closed through a drive cylinder 108 and an operation pipe 109.

Inside chuck 106 is a face driver 110, which can be advanced and retreated in directions of arrows A1, B1, i.e., the Z-axis direction with respect to chuck 106, through a drive cylinder 111 and an operation rod 112 in such a manner as to rotate in the directions of arrows E, F integrally with work spindle 105.

A tail spindle 113 is disposed on tailstock 102 so as to be movable in directions of arrows A2, B2, i.e., the Z-axis direction, through a sleeve 114.

A method of machining a crank shaft 115, which is a workpiece, will be described with reference to FIG. 12. Chuck gripper 107 is open before machining. First, crank shaft 115 is carried on temporary holding stand 103, which is thereafter moved up in the direction of arrow C. Then, operation rod 112 and face driver 110 are moved in the direction of arrow B1, and face driver 110 is fed to an advance position that is ahead of the chuck rightward. Then, tail spindle 113 is moved in the direction of arrow A2 to hold both end surfaces of crank shaft 115 with face driver 110 and tail spindle 113, and temporary holding stand 103 is thereafter lowered in the direction of arrow D. The outer circumference of crank shaft 115 is machined under this condition. Upon completion of the machining of the outer circumference, tail spindle 113 is moved in the direction of arrow A2, whereas face driver 110 is moved in the direction of arrow A1. With the machined outer circumference so moved as to be inserted into chuck gripper 107 that is in open position, chuck gripper 107 is closed. Crank shaft 115 is machined while held by chuck gripper 107 and tail spindle 113 thereafter. For a combined lathe which turns a long workpiece, however, the workpiece must be gripped by two opposed headstocks and the headstocks driven in synchronization with each other to turn the workpiece. Hence, the example has limitations.

Also, in the conventional apparatus constructed as described above, when the two headstocks are coupled by the workpiece, the displacement of the mechanical system and the displacement of the workpiece itself appear as loads on the servo motors. However, these displacements are the pressure displacement of the workpiece caused by chucking pressure, the thermal displacement of the workpiece attributable to heat generated during cutting, the thermal displacement of the machine due to the frictional heat of machine movement, and the like, and cannot be eliminated. For this reason, excessive force will be applied to the workpiece, reducing turning accuracy.

Known to improve the above disadvantages is Japanese Laid-Open Patent Publication No. HEI4-65701. A synchronous feed axis joint operation method for a lathe is disclosed in which the lathe has a first feed axis and a second feed axis for driving two opposed headstocks, the two headstocks are coupled via a workpiece, and the two feed axes are controlled to operate jointly in synchronization with each other. From a difference between the torques of the two feed axes under synchronous joint operation control, the displacement of the machine or the workpiece is detected and the compensation value of a position relative to the feed axes is calculated and used to compensate for the positions of the feed axes. This method is applicable to a case where both ends of the workpiece were held by chucks but could not be used for a case where both ends of the workpiece were held by face drivers because the face drivers must be kept pressed against the workpiece.

SUMMARY OF THE INVENTION

An object of the invention is to provide a workpiece holding method for a machine tool which not only allows outer circumferential portions of a workpiece conventionally gripped by chucks to be machined without correcting the holding position of the workpiece, but also allows the workpiece to be rotated at a high speed without involving the gripping of the workpiece with the chucks.

Another object of the invention is to provide a control apparatus for a machine tool which does not reduce in machining accuracy if displacements occur.

A further object of the invention is to allow a pressing force to be specified as a parameter for a machining program when a workpiece is retained between opposed workpiece holding structures with a given pressing force.

Yet another object of the invention is to provide a control apparatus for a machine tool which does not result in overadjustment due to the variations of the displacements and which does not have a reduced machining accuracy.

Another object of the invention is to provide a machine tool controller that controls workpiece clamping forces of confronting workpiece holding means by utilizing position feedback in the workpiece holding method for a machine tool in which a long workpiece such as a long bar is machined by clamping such workpiece with the confronting workpiece holding means.

Another object of the invention is to provide a machine tool controller that controls workpiece clamping forces of confronting workpiece holding means by utilizing current outputted to servomotors in the workpiece holding method for a machine tool in which a long workpiece such as a long bar is machined by clamping such workpiece with the confronting workpiece holding means.

According to the invention, the workpiece is retained between the face drivers on both ends with the predetermined pressing force, whereby the portions which were secured by chucks conventionally can be machined. Also, unlike the conventional approach, it is not necessary to remove the workpiece and subsequently machine the portions secured by the chucks.

According to the invention, an unnecessary load caused by the displacement of the machine itself or the workpiece itself can be prevented from being applied to the workpiece, thereby improving the machining accuracy of the workpiece. Also, since an unnecessary load is not imposed on the servo motors, the power consumption of the servo motors can be reduced. Further, since the machine itself is not distortion-prone, the accuracy of the machine itself can be maintained for many years.

According to the invention, the torque values of the servo motors can be changed by parameter or machining program setting, whereby conditions can be changed as appropriate according to machining variables, e.g., the workpiece type, such as a firm or a soft workpiece, or the cutting program which may impose a variety of loads on the workpiece.

According to the invention, the measurement of the change in pressing force for a predetermined period of time can be utilized to determine the appropriate force for pressing the headstocks against the workpiece, whereby smooth control can be ensured.

DESCRIPTION OF THE PREFERRED EMBODIMENTS

Figure 1:
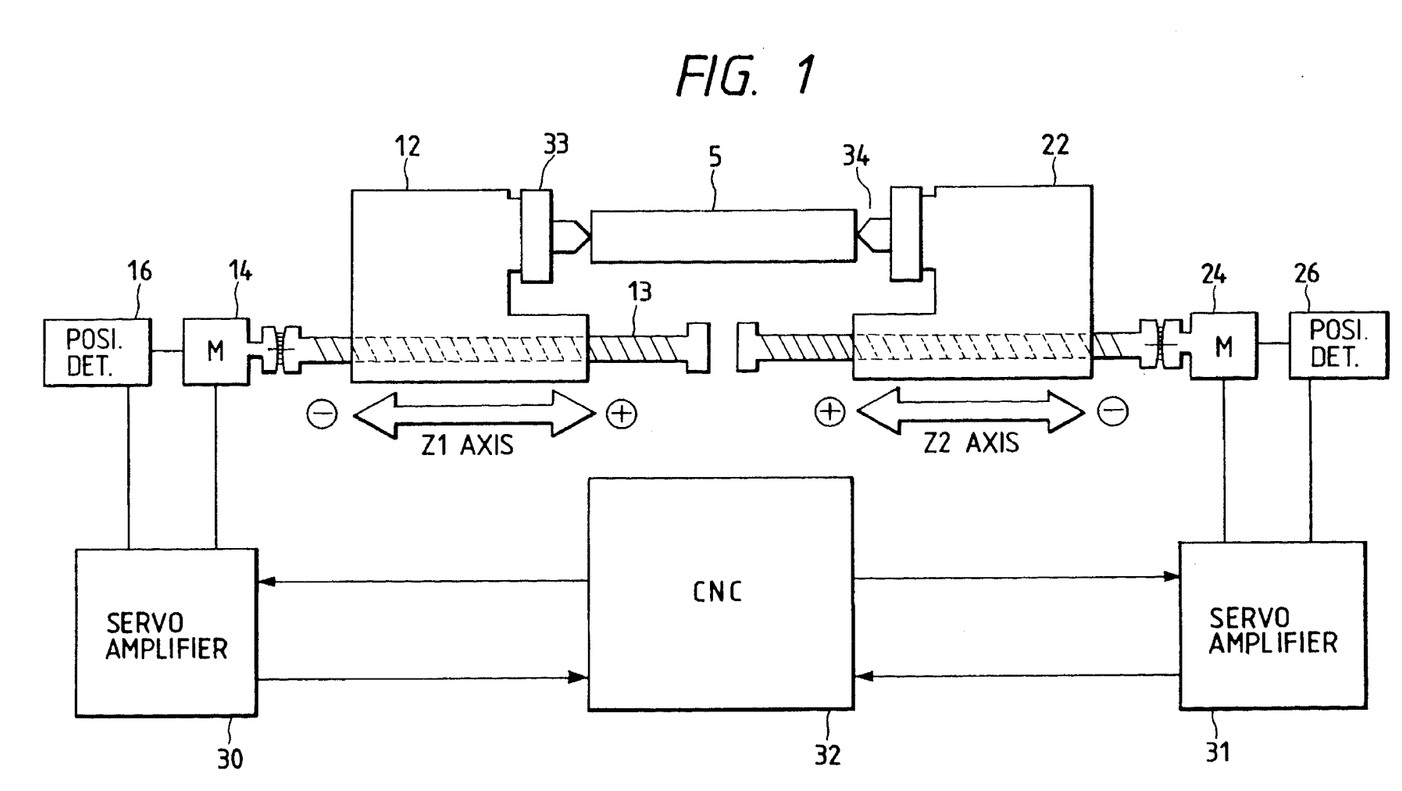
FIG. 1 is an arrangement diagram according to a first embodiment of the invention.

A first embodiment of the invention will now be described with reference to the drawings. In FIG. 1, the numeral 5 indicates a workpiece, 33 represents a face driver making contact with the end face adjacent to the rotary axis of the workpiece 5, 12 denotes a headstock mounted with a spindle to which the face driver is attached, 13 designates a ballscrew coupled with the headstock 12 for driving the ballscrew, 14 indicates a Z-axis servo motor coupled with the ballscrew 13 for driving the ballscrew, 16 represents a position detector coupled with the Z-axis servo motor 14, 30 designates a servo amplifier for driving the Z-axis servo motor 14, 32 denotes an NC which gives a command to the servo amplifier 30 to control the Z-axis servo motors 14 and 24, and 34 represents a face driver making contact with the end face adjacent to the rotary axis of the workpiece 5.

A second group of components 22 to 24, 26 and 31 denote identical units corresponding to the headstock 12, ballscrew 13, Z-axis servo motor 14, position detector 16 and servo amplifier 30, and therefore will not be described.

Figure 4:
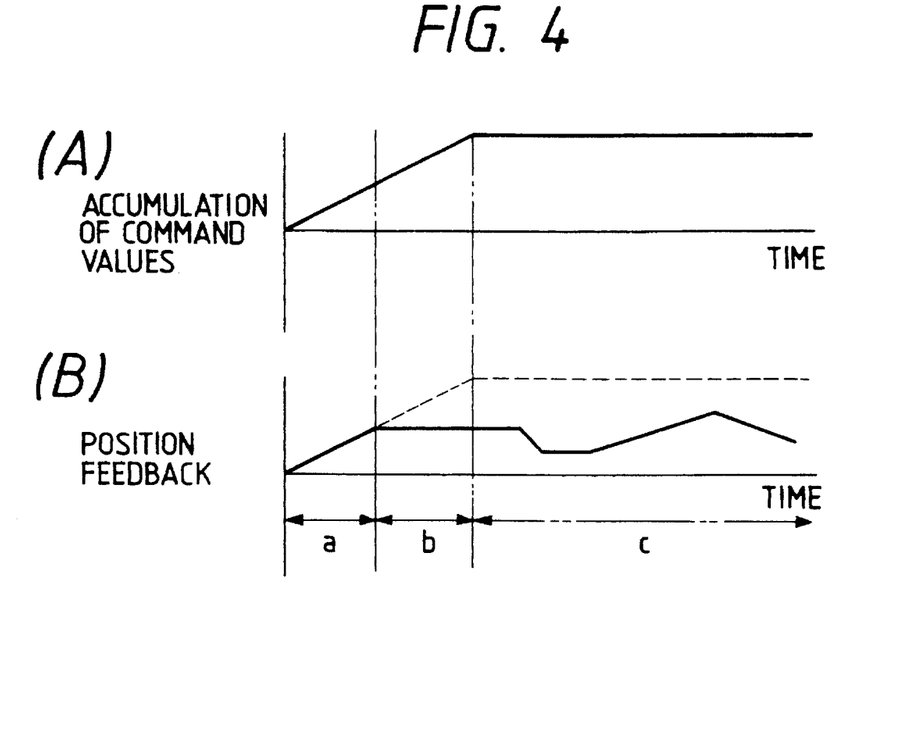
FIG. 4 illustrates a relationship between position command value and position feedback data.
Figure 5:
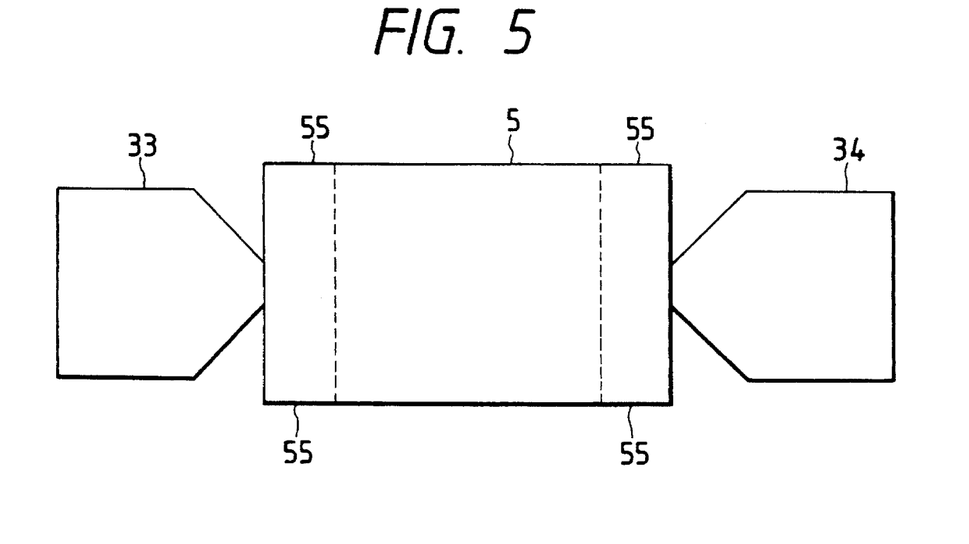
FIG. 5 illustrates the details of face drivers and a workpiece shown in FIG. 1.

FIG. 5 shows the workpiece 5 held by the face drivers 33, 34. Portions 55 of the workpiece 5 can be cut because the workpiece 5 has been held by the face drivers 33, 34. Since the rotary axis portions of the workpiece 5 are retained between the face drivers 33, 34 on both ends with a given torque value as shown in FIG. 4, the workpiece 5 does not fall when it is not gripped by the chuck 11 in a manner shown in FIG. 9. Also, only the rotary axis portions of the workpiece 5 are gripped, whereby the end portions 55 that could not be turned when gripped by the chuck 11 can be turned.

Figure 3:
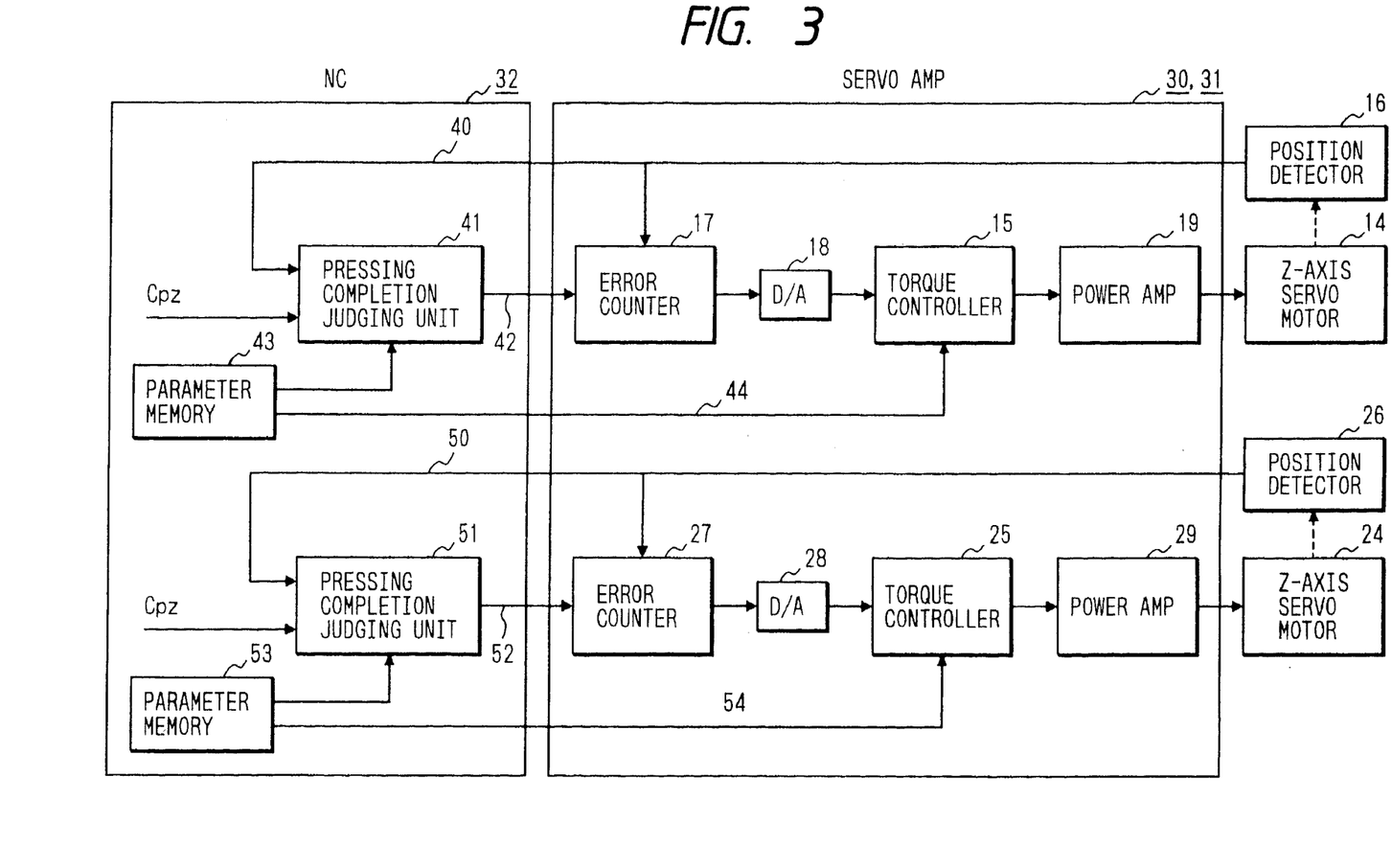
FIG. 3 illustrates the details of an NC and servo amplifiers shown in FIG. 1.

An embodiment of the invention will now be described with reference to the drawings. FIG. 3 is a block diagram of the NC 32 for controlling the lathe shown in FIG. 1. In that figure, the Z-axis servo systems 30, 31 are shown. An X-axis servo system (not shown) includes an X-axis servo motor which drives a tool rest (not shown). A position detector is for detecting the position of the tool rest and an error counter is for detecting a difference between a position command pulse CPX and a position feedback pulse. A digital-to-analog converter is for converting the value of the error counter into an analog value, and power amplifier is for amplifying the analog value from the digital-to-analog converter to drive the servo motor.

In the servo system 30, a Z-axis servo motor 14 is for driving the headstock 12. A torque value control unit 15 is operative to control the output torque of the Z-axis servo motor 14. A position detector 16 is for detecting the position of the headstock 12 and an error counter 17 is for detecting a difference between a position command pulse CPZ and a feedback pulse from the position detector 16. The digital-to-analog converter 18 is for converting the value of the error counter 17 into an analog value, and a power amplifier 19 is for amplifying the analog value from the digital-to-analog converter 18 to drive the servo motor 14.

In the servo system 31, 24 to 29 indicate components similar to the Z-axis servo motor 14, torque value control unit 15, position detector 16, error counter 17, digital-to-analog converter 18 and power amplifier 19, and will not be described.

Within the NC 32, a position feedback pulse output 40 from the Z-axis position detector 16 is input to a pressing completion judging unit 41, which generates a command value 42 for moving the headstock 12 against the workpiece 5. A parameter memory 43 contains parameter data required for the NC 32 to perform arithmetic operation, e.g., axis move data that is input to the judging unit 41. The memory 43 also stores a torque limit value 44 for determining the torque value of the Z-axis servo motor 14.

Also within NC 32 are a corresponding judging unit 51 and a memory 53 which have corresponding pulse output signals 50, command pulses 52 and torque limit values 54. These items 50 to 54 correspond identically to the position feedback pulse 40, pressing completion judging unit 41, command value 42, parameter memory 43 and torque limit value 44 to drive the Z-axis servo motor 24.

FIG. 4 illustrates the cumulative value of the position command values 42, 52 and the position feedback values 40, 50 in the form of a graph. Graph part A in FIG. 4 indicates the accumulation of command data 42 over time while graph part B indicates the accumulation of position feedback data 40 over time. The dotted line in part B is an ideal curve while the solid line in part B is the actual curve in operation. In the Figure, the period "a" along the time axis illustrates the existence of an ordinary relationship between the position command values 42, 52 and the position feedback values 40, 50. Period "b" in the Figure indicates a relationship between the position command values 42, 52 and the position feedback values 40, 50 when the headstocks 12, 22 are in contact with the workpiece 5. Period "c" in FIG. 4 indicates a relationship between the position command values 42, 52 and the position feedback values 40, 50 when the workpiece 5 is retained between the headstocks 12, 22 on both ends under servo control.

In this combined lathe, the headstocks 12, 22 and the face drivers 33, 34 are pressed against both ends of the single workpiece 5 to retain the workpiece 5 therebetween, whereby the workpiece 5 is turned while simultaneously the headstocks 12, 22 are operated jointly in synchronization with each other.

The fundamental design of the present embodiment is to cut the workpiece 5 which is retained between and therefore held by the headstocks 12, 22 with given pressing force.

Figure 2:
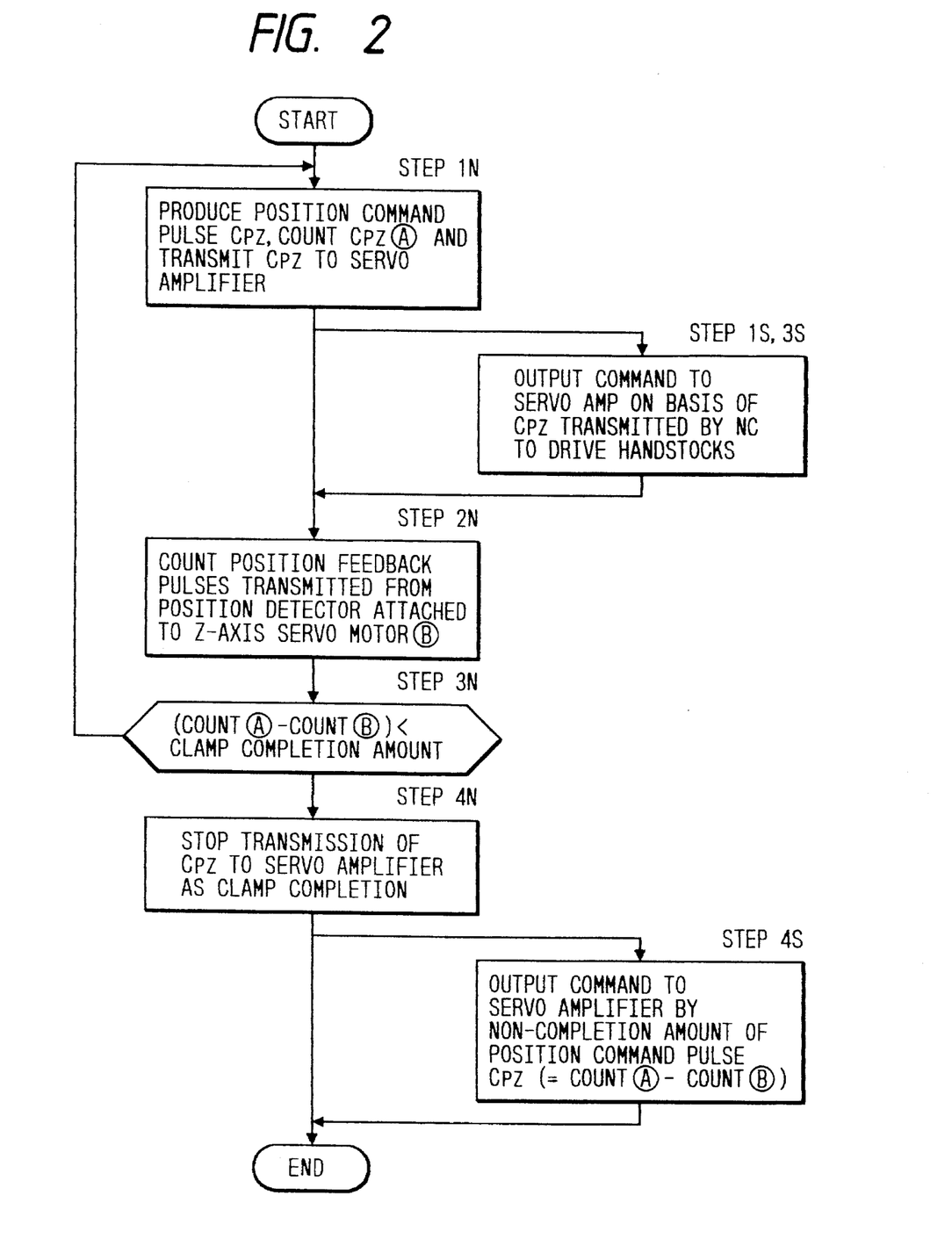
FIG. 2 is a flow chart according to a first embodiment of the invention.

First, the operation for controlling the workpiece 5 with given pressing force will be described with reference to FIGS. 1, 2 and 3. FIG. 2 is a flowchart showing a workpiece holding method for the machine tool, which is an embodiment of the first aspect of the invention. In FIG. 2, steps 1N to 4N are the processing performed by NC 32; and steps 1S, 3S, and 4S are the processing performed by servo amplifiers 30, 31. The workpiece holding method for the machine tool according to the invention may be described as follows.

NC 32 prepares position command pulses CPZ in response to a motion command for moving headstocks 12, 22 that serve to hold the workpiece and carry face drivers 33, 34. NC 32 not only counts position command pulses CPZ, but also transmits the count to servo amplifiers 30, 31 (Step 1N).

Servo amplifiers 30, 31 command servo motors 14, 24 in accordance with position command pulses CPZ transmitted from NC 32 to drive headstocks 12, 22 (Step 1S). Specifically, to move the headstock 12 toward the workpiece 5, the NC 32 outputs a position command value 42 to the servo amplifier 30. The position command value 42 and the position feedback 40 are input to the error counter 17. Specifically, a difference is taken between the command value 42 and the value 40 from the position detector 16, and the difference is provided to the power amplifier 19 through the digital-to-analog converter 18. As a result, the Z-axis servo motor 14 is driven at the speed corresponding to the error value to move the headstock 12. The headstock 22 is moved in a similar manner.

In this process, NC 32 checks if the difference between the accumulated value of position command pulses CPZ and the accumulated value of the position feedback pulses 40, 50 of headstocks 12, 22 has reached a predetermined value defined as the clamp completion amount. If the difference is equal to or smaller than the clamp completion amount stored in memory 43 (during period a of FIG. 4), NC 32, judging that the clamp completion amount has not been reached, returns to step 1N. If, on the other hand, it is judged that the difference is greater than the clamp completion amount (during period b of FIG. 4), then NC 32 advances to step 4N (Step 3N).

Next, the state when the headstock 12 comes into contact with the workpiece 5 is illustrated by graph portion "B" during time period "b" of FIG. 4. Since the headstock 12 in contact with the workpiece 5 cannot travel as commanded by the motion command, the position feedback pulse 40 from the position detector 16 stops changing. However, servo amplifiers 30, 31 continue to command servo motors 14, 24 by position command pulses CPZ transmitted from NC 32 in order to try to drive headstocks 12, 22 (Step 3S).

As a result, when the state indicated during time period "b" in FIG. 4 has continued for a while, the difference between the position feedback pulse 40 and the position command value 42 increases, as seen from a comparison of graph portions A and B in that period. When the difference between the accumulated position feedback pulses 40, 50 for headstocks 12, 22 and the accumulated value of position command pulses CPZ exceeds the pressing completion value set in the parameter memory 43, as determined by the pressing completion judging unit 41, the transmission of position command pulses CPZ to servo amplifiers 30, 31 is no longer effected (Step 4N).

This is the state indicated by the beginning of period "c" in graph portion "B" in FIG. 4. The Z-axis servo motor 24 for moving the headstock 22 also exercises similar control. In this state, both ends of the workpiece 5 are kept pressed with a predetermined pressing force to hold the workpiece 5.

Although no motion command per unit time is transmitted from NC 32, servo amplifiers 30, 31 continue to command servomotors 14, 24 as required by the clamp completion amount (Step 4S).

The workpiece is kept held with a predetermined clamping force by the above steps. Similarly, NC 32 takes steps 1N to 4N and servo amplifiers 30, 31 takes steps 1S, 3S, and 4S upon reception of a next motion command.

A case where the thermal displacement of the workpiece 5 due to the heat generated during cutting, and the thermal displacement of the machine due to the frictional heat, etc., of machine movement, will now be described.

First, consider a case where the displacement has worked in the negative direction of the Z axis due to the expansion of the workpiece 5. If the force attributable to this displacement is larger than the torque of the Z-axis servo motor 14, the Z-axis servo motor 14 cannot endure the force resulting from the displacement because of the given torque value and is pushed back in the negative direction. Where the displacement has worked in the positive direction of the Z axis due to the contraction of the workpiece 5, there is a difference between the position feedback data 40 and the position command value 42, and the workpiece 5 is kept pressed with the given torque value as described above to cause the servo motor 14 to approach the position command value. Hence, when the workpiece 5 is displaced in the positive direction, the headstock moves with the given pressing force by that value.

As a result, the Z-axis servo motor 14 is controlled in response to the workpiece displacement, whereby the workpiece 5 is held with the given pressing force if the displacement takes place. This is the state indicated by period "c" in FIG. 4. The Z-axis servo motor 24 for moving the headstock 22 also carries out similar control.

Figure 6:
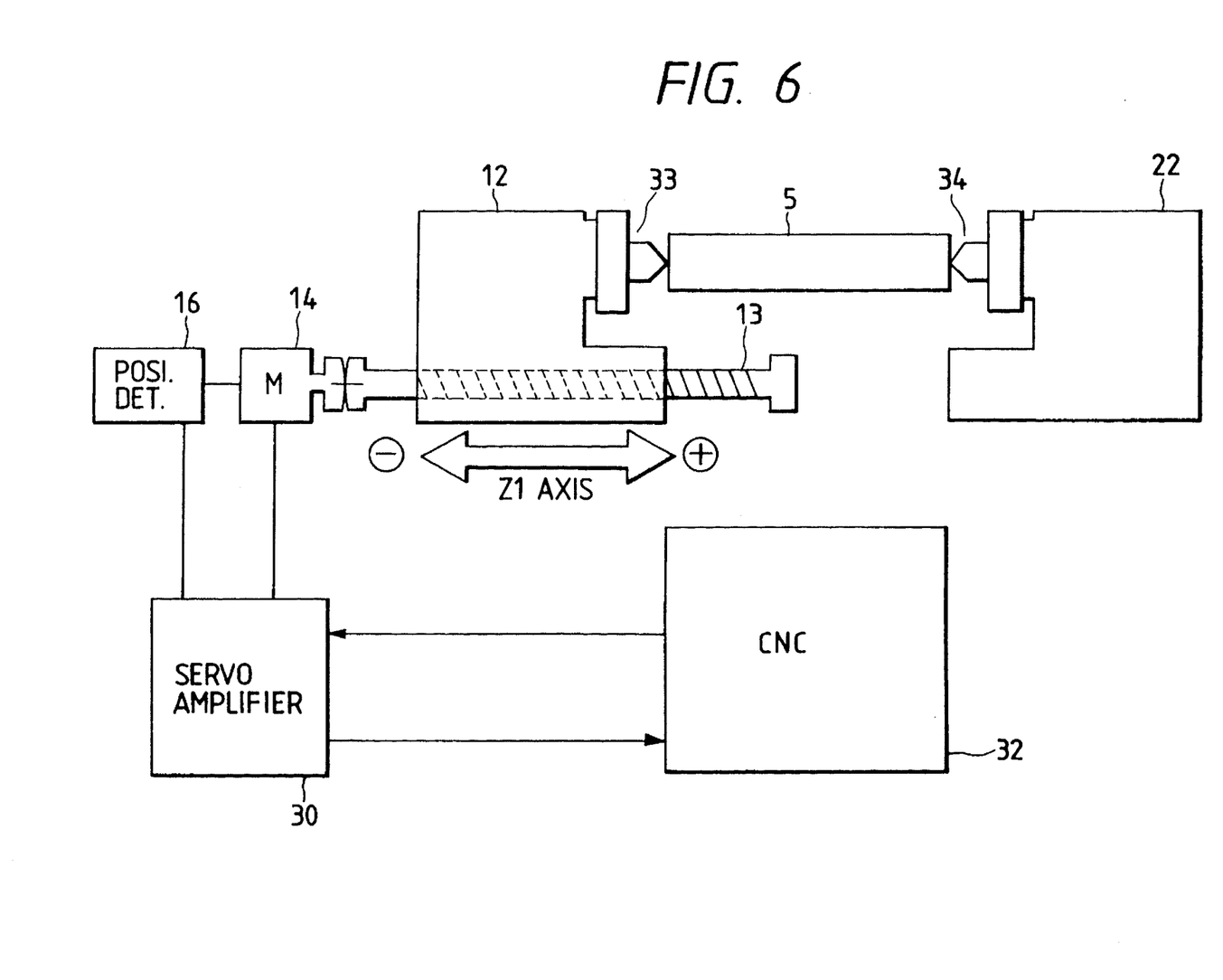
FIG. 6 is an arrangement diagram according to a second embodiment of the present invention.

In retaining the workpiece 5 between the two headstocks 12, 22 as described above, if the Z-axis servo motor 24, the position detector 25 and the servo amplifier 31 are inoperative, such that the system assumes the configuration shown in FIG. 6, only a distance over which the headstock 12 travels to make contact with the workpiece 5 increases and the control of the headstock 12 can be exercised in the identical manner. Namely, if the headstock 22 is inoperative, the headstock 12 presses the workpiece 5 on one end with the given pressing force, but the headstock 22 presses the workpiece by reaction. Thus, the same effect is achieved whenever the workpiece is retained between the headstocks 12, 22.

Referring to FIG. 6, 5 indicates a workpiece, 33 denotes a face driver making contact with the end face adjacent to the rotary axis of the workpiece 5, 12 represents a headstock mounted with a spindle, 13 designates a ballscrew coupled with the headstock 12 for driving the same, 14 indicates a Z-axis servo motor coupled with the ballscrew 13 for driving the same, 16 represents a position detector coupled with the Z-axis servo motor, 30 denotes a servo amplifier for driving the Z-axis servo motor 14, 32 designates an NC which gives a command to the servo amplifier 30 to control the Z-axis servo motors 14 and 24, and 34 represents a face driver making contact with the end face adjacent to the rotary axis of the workpiece 5.

Yet another embodiment of the invention can be described with reference to FIGS. 3 and 4. Referring to FIG. 4, when the headstock 12 comes into contact with the workpiece 5, this is the state indicated in period "b". Since the headstock 12 in contact with the workpiece 5 cannot travel, the position feedback pulse stored in 40 from the position detector 16 stops changing. Generally, in this state, the Z-axis servo motor 14 attempts to rotate with the maximum torque of the power amplifier 19 output, resulting in overload. If a predetermined value is exceeded, an overload alarm occurs, causing the output to stop. In the present invention, if data requiring a torque value greater than the torque limit value 44 set in the parameter memory 43 is output from the digital-to-analog converter 18, the output data of the digital-to-analog converter 18 is cut down in the pressing force control unit 15 and the resultant data is output to the power amplifier 19. As a result, the Z-axis servo motor 14 can output at a given torque value a load in excess of the torque limit value 44 will not be applied to the Z-axis servo motor 14. The Z-axis servo motor 24 for moving the headstock 22 also carries out similar control.

Figure 7:
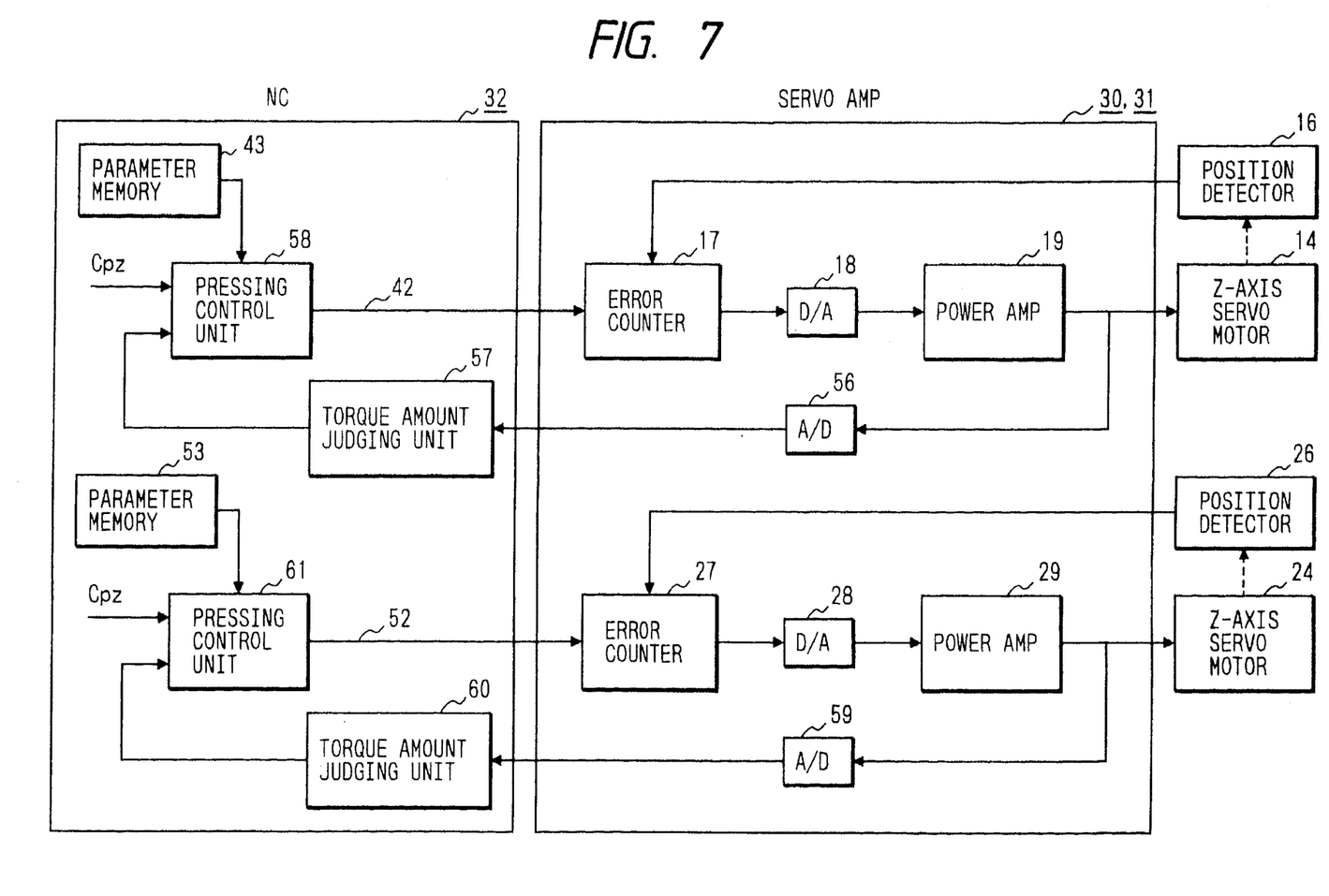
FIG. 7 illustrates the details of an NC and servo amplifiers shown in FIG. 6.

A further embodiment of the invention will now be described with reference to FIG. 7, which is a block diagram of the NC 32 for controlling the lathe shown in FIG. 1, the Z-axis servo amplifier systems 30, 31, and an X-axis servo motor (not shown). In FIG. 7, a Z-axis servo motor 14 is for driving the headstock 12 and an analog-to-digital converter 56 is for converting a analog torque value into a digital signal (this data resultant from the output is hereinafter referred to as the "pressing force"). Position detector 16 is for detecting the position of the headstock 12, error counter 17 is for detecting a difference between a position command pulse CPZ and a feedback pulse from the position detector 16, digital-to-analog converter 18 is for converting the value of the error counter 17 into an analog value, and power amplifier 19 is for amplifying the analog value from the digital-to-analog converter 18 to drive the servo motor 14.

The command value 42 for moving the headstock 12 and the memory 43 for storing parameters and other data required for the NC 32 to perform arithmetic operation, e.g., axis move data are the same as in previous embodiments. A pressing force judging unit 57 is for accurately measuring a pressing force on the basis of the output from the analog-to-digital converter 56. The pressing control unit 58 is responsive to the output of judging unit 57 and is operative to generate a command 42 for controlling the Z-axis servo motor 14 to provide the given pressing force.

Components 24, 26 to 29, 52, 53 and 59 to 61 correspond identically to the Z-axis servo motor 14, position detector 16, error counter 17, digital-to-analog converter 18, power amplifier 19, command value 42, parameter memory 43, analog-to-digital converter 56, pressing force judging unit 57 and pressing control unit 58 to drive the Z-axis servo motor 24.

Figure 8A:
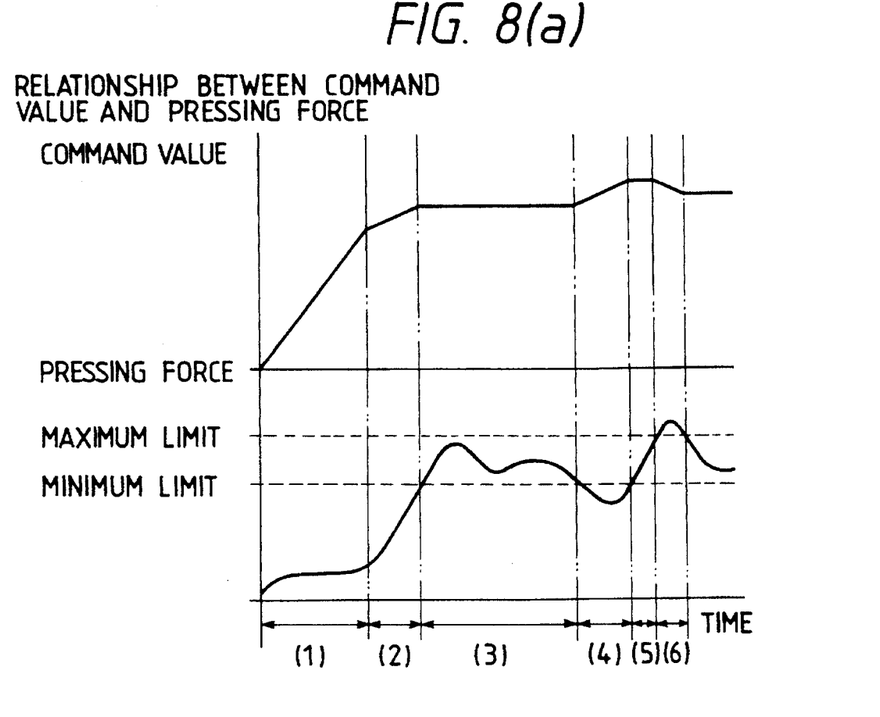
FIGS. 8(a) and 8(b) illustrate the relationship of pressing force with the command value and a pressing force judging method.

FIG. 8(*a*) illustrates the cumulative value of the position command values 42, 52 in the form of a graph and shows a relationship between the cumulative value and the pressing force, i.e., the outputs of the analog-to-digital converters 56, 59. Graph portion (1) in this drawing along the time axis indicates a relationship between the command values 42, 52 and the pressing force at an ordinary axis travel time. Graph portion (2) represents a relationship between the command values 42, 52 and the pressing force in a state wherein the headstocks 12, 22 are in contact with the workpiece 5. Graph portion (3) indicates a relationship between the command values 42, 52 and the pressing force in the stop state of the command values, the pressing force being confined between maximum and minimum values. Graph portion (4) shows a relationship between the command values 42, 52 and the pressing force at a time when the pressing force has reduced below a minimum value due to machine displacement, etc. Graph portion (5) indicates a relationship between the command values 42, 52 and the pressing force in the stop state of the command values. Graph portion (6) represents a relationship between the command values 42, 52 and the pressing force at a time when the pressing force has increased above a maximum value due to machine displacement, etc.

The fundamental design of the present embodiment is to cut the workpiece 5, which is retained between and therefore secured by the headstocks 12, 22 with the given pressing force. First, the means for exercising control to keep the workpiece 5 retained between the headstocks with the given pressing force will be described. To move the headstock 12 toward the workpiece 5, the NC 32 outputs a command value 42 to the servo amplifier 30. The position command 42 is added to the contents of the error counter 17, the difference between the command value and the value of the position detector 16 is given to the power amplifier 16 through the digital-to-analog converter 18 and the Z-axis servo motor 14 is driven at the speed corresponding to the error value to move the headstock 12. The headstock 22 is also moved by similar means. Generally, this is the state indicated by graph portion (1) in FIG. 8(*a*), and the pressing force is approximately the given force provided to move the headstock 12.

Next, when the headstock 12 comes into contact with the workpiece 5, a state indicated by graph portion (2) in FIG. 8(*a*), the command value 42 is output to make the speed lower than in the region (1) in FIG. 8(*a*), but the pressing force increases sharply. The reason is that since the headstock 12 in contact with the workpiece 5 cannot travel, the Z-axis servo motor 14 also stops running and the position detector 16 also stops changing, increasing the difference of the error counter 17. In response to a large value, the power amplifier 19 attempts to travel rapidly to the position specified by the command value 42, thereby providing a large output. As a result, the pressing force increases.

The region (3) in FIG. 8(*a*) will now be described. When the pressing force increases and exceeds the minimum pressing force limit set in the parameter memory 43, the pressing control unit 58 judges that the specified pressing force has been reached and stops the output of the command value 42. As a result, the pressing force becomes settled in the vicinity of the value set in the parameter store 43, with some slight variations over time.

A case where the thermal displacement of the workpiece due to the heat generated during outing done in this state and the thermal displacement of the machine due to the frictional heat, etc., of machine movement have occurred will now be described.

First, the region (4) in FIG. 8(*a*) will be described. Assume that the displacement has occurred in the direction in which a gap is provided between the workpiece 5 and the headstock 12 due to the heat and the like of the machine and the workpiece 5. Then, the displacement occurs in the same direction that the workpiece 5, which has been pressed by the headstock 12, moves. Consequently, the pressing force lowers. As a result, the pressing control unit 58 judges that the workpiece 5 has contracted and outputs the command value 42 to move the headstock 12 in the direction in which it is pressed against the workpiece 5 (in the positive direction of the Z axis). As a result, the headstock 12 is pressed against the workpiece 5 again and the pressing force increases.

Next, the region (5) in FIG. 8(*a*) will be described. As the result of the control in the region (4), the pressing force reaches the value set in the parameter store 43 and the pressing control unit 58 stops the output of the command value 42.

Next, the region (6) in FIG. 8(a) will be described. Assume that the displacement has occurred in the direction in which the workpiece 5 and the headstock 12 are pressed against each other due to the heat and the like of the machine and the workpiece 5. Then, the displacement works in the direction in which the workpiece 5 that had been pressed by the headstock 12 is further pressed, whereby the pressing force increases to push back the pushing force and exceeds the set maximum pressing force limit. As a result, the pressing control unit 58 judges that the workpiece 5 has expanded and outputs the command 42 to move the headstock 12 in the direction away from the workpiece 5 (in the negative direction of the Z axis). As a result, the relationship between the headstock 12 and the workpiece 5 is made adequate and the pressing force drops below the maximum pressing force limit set in the parameter memory 43. As a result, the pressing control unit 58 judges that the pressing force has reached the value set in the parameter memory 43 and stops the command value 42.

The Z-axis servo motor 24 for operating the headstock 22 also exercises similar control by means of the position detector 26, the error counter 27, the digital-to-analog converter 28, the power amplifier 29, the command value 52, the parameter store 53, the analog-to-digital converter 59, the pressing force judging unit 60 and the pressing control unit 61.

As described above, the servo motor 14 is controlled in response to the actual displacement experienced in the system, whereby the workpiece 5 is retained between the headstocks with the given pressing force if any displacement occurs.

In the system for retaining the workpiece 5 between the two headstocks 12, 22 as described above, if the Z-axis servo motor 24, the position detector 25 and the servo amplifier 31 are inoperative, only a distance over which the headstock 12 travels to make contact with the workpiece 5 increases and the control of the headstock 12 can be exercised in the identical manner. Namely, if the headstock 22 is inoperative and the headstock 12 presses the workpiece 5 on one end with the given pressing force, the headstock 22 presses the workpiece by reaction, whereby the same effect as when the workpiece is retained between two operative headstocks 12, 22 is provided.

Figure 8B:
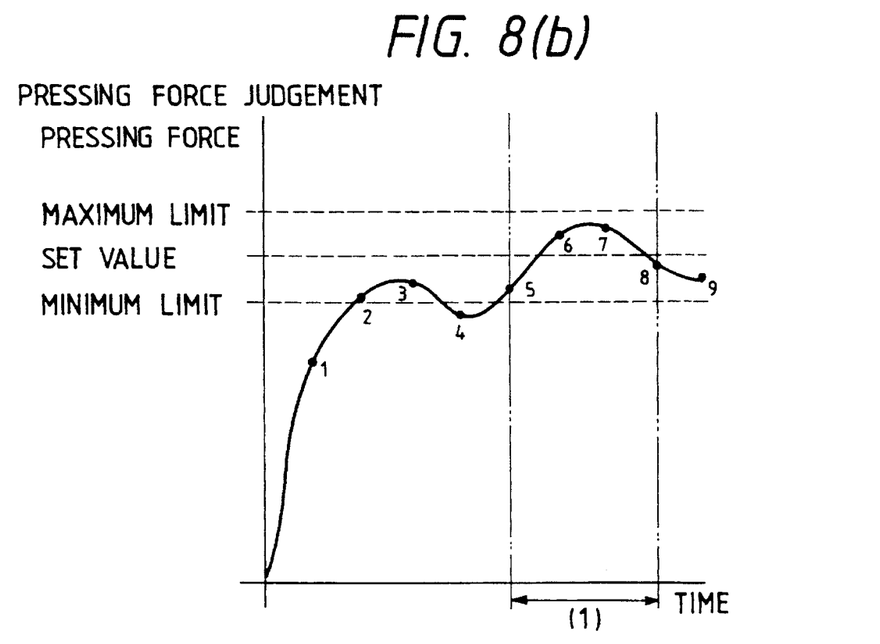

Another embodiment of the invention will now be described with reference to the drawings. The pressing force judging unit 57 in the present invention will be described in accordance with FIG. 8(b). FIG. 8(b) illustrates the details of the regions (2) and (3) in FIG. 8(a). In this drawing, black dots (.) indicate positions sampled at intervals of given time and region (1) in FIG. 8(b) shows an example wherein the sampled data has fallen within the setting range used for the judgement of the preset pressing force a predetermined number of times.

Data used for pressing force judgement, which is originally analog data output from the power amplifier 19, varies. Also, when that data is converted into digital data by the analog-to-digital converter 56, it varies due to a conversion error or the like. For this reason, the pressing force sampled has a waveform as in FIG. 8(b).

When such a waveform is sampled by the NC 32, the following results. At the first sampling, the pressing force is judged to have fallen outside the set value range. When the pressing force is judged to have fallen within the set value range at the second sampling and the data is transferred to the control unit 58, the pressing force is within the set value range at the third sampling but it falls outside the range at the fourth sampling. Hence, exact data cannot be transferred to the pressing control unit 58.

For this reason, whether or not the pressing force has fallen within the setting range is judged a given number of times (four times in the drawing) as in the region (1) in FIG. 8(b). After it has been confirmed that the pressing force has settled, the pressing control unit 58 is notified that the pressing force has fallen into the specified value range. This allows faulty operation due to the variations of the pressing force to be prevented.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A control apparatus for a machine tool including opposed workpiece holding means for machining a workpiece having a longitudinal axis of rotation and opposite end faces held by said workpiece holding means, and a driving means for driving at least one of said workpiece holding means to press said holding means against a workpiece end face, said control apparatus comprising pressing completion judging means for judging, throughout a machining process, whether or not the operation of said driving means is complete.

2. The control apparatus for the machine tool as defined in claim 1, further comprising pressing force determining means for determining the pressing force for pressing the opposed workpiece holding means against the workpiece, and pressing force control means for controlling the pressing force for pressing said workpiece holding means against the workpiece with the pressing force determined by said pressing force determining means.

3. A control apparatus for a machine tool including opposed workpiece holding means for machining a workpiece having a longitudinal axis of rotation and opposite end faces held by said workpiece holding means, and a driving means for driving at least one of said workpiece holding means to press said holding means against a workpiece end face, the control apparatus comprising:

pressing completion judging means for judging, throughout a machining process, whether or not the operation of said driving means is complete;

pressing force determining means for determining the pressing force for pressing the opposed workpiece holding means against the workpiece;

pressing force control means for controlling the pressing force which presses said workpiece holding means against the workpiece with the pressing force determined by said pressing force determining means, wherein the pressing force determining means measures pressing force at given time intervals to judge the pressing force by whether or not the pressing force is within a specified range during said period.

4. A machine tool for machining a workpiece having a longitudinal axis, said machine tool comprising at least one servo-controlled tool being machineably moveable orthogonal to said workpiece longitudinal axis, a first holding apparatus and a second holding apparatus disposed at opposite axial ends of said workpiece, at least one of said first and second holding apparatus comprising a moveable headstock with a spindle and a face driver that is affixed to said spindle, and means for controlling movement of said moveable headstock throughout a machining process for providing a secure contact to the workpiece end faces with a predetermined pressure.

5. The machine tool as set forth in claim 4 comprising a first servo loop established to control the position of the headstock on the basis of detected position information and a second servo loop established to control the movement of said headstock so that the pressure against the workpiece end faces is kept at said predetermined pressure.

6. The machine tool as set forth in claim 5, wherein said second servo loop comprises means for detecting the position of said moveable headstock and generating a position signal, error means for generating an error signal on the basis of the difference between a command value and said position signal, and means for moving said headstock in response to said error signal.

7. The machine tool as set forth in claim 5, wherein said first servo loop comprises means for detecting the position of said moveable headstock and generating a position signal, error means for generating an error signal on the basis of the difference between a command value and said position signal and means for moving said headstock in response to said error signal, and said second servo loop comprises a parameter storage means for storing predetermined pressure parameters and a pressure judging means responsive to said position signal and said pressure parameters for modifying said error signal.

8. The machine tool as set forth in claim 7, wherein said first servo loop further comprises torque controlling means and said parameter storage means provides torque limiting data to said torque controlling means.

9. The machine tool as set forth in claim 7, wherein said parameters establish at least one of maximum and minimum pressure values.

10. The machine tool as set forth in claim 5, wherein said first servo loop comprises means for detecting the position of said moveable headstock and generating a position signal, error means for generating an error signal on the basis of the difference between a command value and said position signal, means for monitoring said error signal, and means for moving said headstock in response to said error signal, and said second servo loop comprises a parameter storage means for storing predetermined pressure parameters, and a pressure judging means responsive to said monitored error signal and said pressure parameters for controlling said error signal, and wherein said parameters establish at least one of maximum and minimum pressure values.

11. The machine tool as set forth in claim 4, wherein each of said first and second holding apparatus comprises moveable headstocks, movement thereof being controlled by respective first and second servo loops.

12. A machine tool for machining a workpiece having a longitudinal axis, said machine tool comprising:

at least one servo-controlled tool being machineably moveable orthogonal to said workpiece longitudinal axis;

a first holding apparatus and a second holding apparatus disposed at opposite axial ends of said workpiece, at least one of said first and second holding apparatus comprising a moveable headstock with a spindle and a face driver that is affixed to said spindle;

means for controlling movement of said moveable headstock throughout a machining process for providing a secure contact to the workpiece end faces with a predetermined pressure;

a first servo loop established to control the position of the headstock on the basis of detected position information and a second servo loop established to control the movement of said headstock so that the pressure against the workpiece end faces is kept at said predetermined pressure, said first servo loop comprising:
  i) means for detecting position of said moveable headstock and generating a position signal;
  ii) error means for generating an error signal on the basis of the difference between a command value and said position signal; and
  iii) means for moving said headstock in response to said error signal;

and said second servo loop comprising:
  i) a parameter storage means for storing predetermined pressure parameters; and
  ii) a pressure judging means responsive to said position signal and said pressure parameters for modifying said error signal, wherein said pressure judging means measures pressing force at given time intervals to judge the pressing force by whether or not the pressing force is within a specified range during said period.

13. A machine tool for machining a workpiece having a longitudinal axis, said machine tool comprising:

at least one servo-controlled tool being machineably moveable orthogonal to said workpiece longitudinal axis;

a first holding apparatus and a second holding apparatus disposed at opposite axial ends of said workpiece, at least one of said first and second holding apparatus comprising a moveable headstock with a spindle and a face driver that is affixed to said spindle;

means for controlling movement of said moveable headstock throughout a machining process for providing a secure contact to the workpiece end faces with a predetermined pressure;

a first servo loop established to control the position of the headstock on the basis of detected position information, said first servo loop comprising:
  i) means for detecting position of said moveable headstock and generating a position signal;
  ii) error means for generating an error signal on the basis of the difference between a command value and said position
  iii) means for monitoring said error signal:
  iv) means for moving said headstock in response to said error signal;

a second servo loop established to control the movement of said headstock so that the pressure against the workpiece end faces is kept at said predetermined pressure, said second servo loop comprising:
  i) a parameter storage means for storing predetermined pressure parameters; and
  ii) a pressure judging means responsive to said monitored error signal and said pressure parameters for controlling said error signal, wherein said pressure judging means measures pressing force at given time intervals to judge the pressing force by whether or not the pressing force is within a specified range during said period.

14. A method of machining a workpiece having a longitudinal axis with a machine tool, said machine tool comprising at least one servo-controlled tool being machineably moveable orthogonal to said workpiece longitudinal axis, a first holding apparatus and a second holding apparatus disposed at opposite axial ends of said workpiece, at least one of said first and second holding apparatus comprising a moveable headstock with a spindle and a face driver that is affixed to said spindle, comprising the steps of:

a) storing holding pressure parameter values;

b) servo-controlling the positioning of said moveable headstock on the basis of input command values;

c) determining position deviations of the headstock from a desired value;

d) judging a pressure deviation on the basis of said stored parameter values and said determined deviations; and e) commanding the movement of said headstock in response to said judging step f) repeating steps b through e for an entire machining process.

15. The method of machining a workpiece as set forth in claim 14, wherein said determining step comprises detecting the magnitude of an error signal during said servo controlling step.

16. The method of machining a workpiece as set forth in claim 14, further comprising limiting torque generated by a torque generating means in response to stored pressure parameter values.

17. The method of machining a workpiece as set forth in claim 14, wherein said storing step comprises storing maximum and minimum values that determine a range of predetermined pressing forces.

18. The method of machining a workpiece as set forth in claim 17, wherein said determining step comprises measuring said pressing force for a given period of time to judge whether or not the pressing force is within a specified range during said period.

19. A machine tool control apparatus for use in a machine tool, the machine tool comprising at least one servo-controlled tool being machineably moveable orthogonal to said workpiece longitudinal axis, a first holding apparatus and a second holding apparatus disposed at opposite axial ends of said workpiece, at least one of said first and second holding apparatus comprising a moveable headstock with a spindle and a face driver that is affixed to said spindle, the machine tool control apparatus comprising:

means for storing holding pressure parameter values;

means for servo-controlling the positioning of said moveable headstock on the basis of input command values through an entire machining process;

means for determining position deviations of the headstock from a desired value through an entire machining process;

means for judging a pressure deviation on the basis of said stored parameter values and said determined deviations through an entire machining process; and means for commanding the movement of said headstock in response to said judging means through an entire machining process.

* * * * *